US008859955B2

(12) United States Patent
Green

(10) Patent No.: US 8,859,955 B2
(45) Date of Patent: Oct. 14, 2014

(54) FUNCTION SWITCHING WITH FAST ASYNCHRONOUS ACQUISITION

(75) Inventor: Martin Raymond Green, Bowdon (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 14/113,160

(22) PCT Filed: Apr. 20, 2012

(86) PCT No.: PCT/GB2012/050875
§ 371 (c)(1), (2), (4) Date: Feb. 27, 2014

(87) PCT Pub. No.: WO2012/143728
PCT Pub. Date: Oct. 26, 2012

(65) Prior Publication Data

US 2014/0197308 A1 Jul. 17, 2014

Related U.S. Application Data

(60) Provisional application No. 61/478,718, filed on Apr. 25, 2011.

(30) Foreign Application Priority Data

Apr. 20, 2011 (GB) .................................. 1106689.1

(51) Int. Cl.
*B01D 59/44* (2006.01)
*H01J 49/40* (2006.01)
*H01J 49/26* (2006.01)
*H01J 49/00* (2006.01)

(52) U.S. Cl.
CPC ........... *H01J 49/0031* (2013.01); *H01J 49/401* (2013.01)
USPC ............ 250/282; 250/281; 250/287; 250/288

(58) Field of Classification Search
USPC ................................. 250/281, 282, 287, 288
See application file for complete search history.

(56) References Cited

U.S. PATENT DOCUMENTS

| | | | | |
|---|---|---|---|---|
| 5,396,065 A | | 3/1995 | Myerholtz et al. | |
| 5,847,386 A | | 12/1998 | Thomson et al. | |
| 6,111,250 A | * | 8/2000 | Thomson et al. | 250/282 |
| 6,160,256 A | * | 12/2000 | Ishihara | 250/287 |
| 6,992,283 B2 | * | 1/2006 | Bateman et al. | 250/287 |
| 7,034,292 B1 | * | 4/2006 | Whitehouse et al. | 250/289 |
| 7,858,926 B1 | * | 12/2010 | Whitehouse et al. | 250/281 |
| 8,350,212 B2 | * | 1/2013 | Covey et al. | 250/281 |
| 8,410,436 B2 | * | 4/2013 | Mukaibatake et al. | 250/290 |
| 2013/0119247 A1 | * | 5/2013 | Green et al. | 250/282 |
| 2013/0187037 A1 | * | 7/2013 | Wu et al. | 250/282 |
| 2014/0048701 A1 | * | 2/2014 | Green et al. | 250/282 |
| 2014/0051181 A1 | * | 2/2014 | Brown et al. | 436/173 |
| 2014/0138534 A1 | * | 5/2014 | Green et al. | 250/282 |

* cited by examiner

*Primary Examiner* — Bernard E Souw
(74) *Attorney, Agent, or Firm* — Diederiks & Whitelaw, PLC

(57) ABSTRACT

A method of analyzing a sample is disclosed comprising transmitting a first population of ions through a mass spectrometer and switching a state or mode of the mass spectrometer to produce a second population of ions. A sequential stream of mass spectra is acquired asynchronously with respect to switching the state or mode of the mass spectrometer. The stream of mass spectral data is then post-processed to produce mass spectra corresponding predominantly to the first and second population of ions.

36 Claims, 22 Drawing Sheets

120.2
136.2
221.2
278.2
397.2
100
50
%
0
60
160
260
360
460
560
640
m/z 167.1
195.1
236.2
397.2
448.2
609.2
100
50
%
0
60
160
260
360
460
560
640
m/z

| m/z = | 397.174 | m/z = | 397.19 | m/z = | 221.15 | m/z = | 195.13 | m/z = | 174.16 |
|---|---|---|---|---|---|---|---|---|---|
| scan no | Intensity | scan no | Intensity | scan no | Intensity | scan no | Intensity | scan no | Intensity |
| 3515 | 0 | 3515 | 1530 | 3515 | 0 | 3515 | 719 | 3515 | 719 |
| 3516 | 0 | 3516 | 1287 | 3516 | 0 | 3516 | 835 | 3516 | 835 |
| 3517 | 681 | 3517 | 0 | 3517 | 382 | 3517 | 198 | 3517 | 198 |
| 3518 | 398 | 3518 | 0 | 3518 | 3514 | 3518 | 0 | 3518 | 0 |
| 3519 | 554 | 3519 | 0 | 3519 | 2171 | 3519 | 0 | 3519 | 0 |
| 3520 | 435 | 3520 | 0 | 3520 | 2744 | 3520 | 0 | 3520 | 0 |
| 3521 | 837 | 3521 | 0 | 3521 | 3357 | 3521 | 0 | 3521 | 0 |
| 3522 | 980 | 3522 | 0 | 3522 | 2762 | 3522 | 0 | 3522 | 0 |
| 3523 | 630 | 3523 | 0 | 3523 | 2877 | 3523 | 0 | 3523 | 0 |
| 3524 | 684 | 3524 | 0 | 3524 | 2775 | 3524 | 0 | 3524 | 0 |
| 3525 | 777 | 3525 | 0 | 3525 | 4167 | 3525 | 0 | 3525 | 0 |
| 3526 | 546 | 3526 | 0 | 3526 | 3170 | 3526 | 0 | 3526 | 0 |
| 3527 | 594 | 3527 | 0 | 3527 | 3460 | 3527 | 0 | 3527 | 0 |
| 3528 | 1387 | 3528 | 0 | 3528 | 3878 | 3528 | 0 | 3528 | 0 |
| 3529 | 1096 | 3529 | 0 | 3529 | 3458 | 3529 | 0 | 3529 | 0 |
| 3530 | 872 | 3530 | 0 | 3530 | 4485 | 3530 | 0 | 3530 | 0 |
| 3531 | 619 | 3531 | 0 | 3531 | 3326 | 3531 | 0 | 3531 | 0 |
| 3532 | 694 | 3532 | 0 | 3532 | 2682 | 3532 | 0 | 3532 | 0 |
| 3533 | 764 | 3533 | 0 | 3533 | 2579 | 3533 | 0 | 3533 | 0 |
| 3534 | 387 | 3534 | 0 | 3534 | 2778 | 3534 | 0 | 3534 | 0 |
| 3535 | 852 | 3535 | 0 | 3535 | 5794 | 3535 | 0 | 3535 | 0 |

Fig. 14a

| | | | | | | | | | |
|---|---|---|---|---|---|---|---|---|---|
| 3536 | 1352 | 3536 | 0 | 3536 | 5732 | 3536 | 0 | 3536 | 0 |
| 3537 | 0 | 3537 | 3248 | 3537 | 1139 | 3537 | 1299 | 3537 | 1299 |
| 3538 | 0 | 3538 | 2434 | 3538 | 33 | 3538 | 1266 | 3538 | 1266 |
| 3539 | 0 | 3539 | 2760 | 3539 | 0 | 3539 | 1159 | 3539 | 1159 |
| 3540 | 0 | 3540 | 3154 | 3540 | 52 | 3540 | 979 | 3540 | 979 |
| 3541 | 0 | 3541 | 3125 | 3541 | 39 | 3541 | 1588 | 3541 | 1588 |
| 3542 | 0 | 3542 | 1916 | 3542 | 0 | 3542 | 1363 | 3542 | 1363 |
| 3543 | 0 | 3543 | 3645 | 3543 | 0 | 3543 | 1679 | 3543 | 1679 |
| 3544 | 0 | 3544 | 3246 | 3544 | 44 | 3544 | 2394 | 3544 | 2394 |
| 3545 | 0 | 3545 | 3105 | 3545 | 0 | 3545 | 1443 | 3545 | 1443 |
| 3546 | 0 | 3546 | 2243 | 3546 | 0 | 3546 | 1062 | 3546 | 1062 |
| 3547 | 0 | 3547 | 3418 | 3547 | 0 | 3547 | 1187 | 3547 | 1187 |
| 3548 | 0 | 3548 | 3393 | 3548 | 0 | 3548 | 1834 | 3548 | 1834 |
| 3549 | 0 | 3549 | 3699 | 3549 | 97 | 3549 | 1241 | 3549 | 1241 |
| 3550 | 0 | 3550 | 2609 | 3550 | 0 | 3550 | 2320 | 3550 | 2320 |
| 3551 | 0 | 3551 | 2829 | 3551 | 0 | 3551 | 1114 | 3551 | 1114 |
| 3552 | 0 | 3552 | 2396 | 3552 | 0 | 3552 | 1072 | 3552 | 1072 |
| 3553 | 0 | 3553 | 2033 | 3553 | 0 | 3553 | 1014 | 3553 | 1014 |
| 3554 | 0 | 3554 | 1409 | 3554 | 0 | 3554 | 421 | 3554 | 421 |

Fig. 14b 160
120
80
40
0
Intensity
10
30
50
70
90
time 160
120
80
40
0
Intensity
1
2
10
30
50
70
90
time 160
120
80
40
0
Intensity
10
30
50
70
90
time

| Spectrum 1 | | | |
|---|---|---|---|
| m/z | Intensity Measured | Intensity Total | % Error |
| 50 | 604 | 840 | 28 |
| 200 | 604 | 840 | 28 |
| Spectrum 2 | | | |
| m/z | Intensity Measured | Intensity Total | % Error |
| 100 | 1183 | 1680 | 30 |
| 200 | 1155 | 1680 | 31 |

Fig. 18

| Spectrum 1 | | | |
|---|---|---|---|
| m/z | Intensity Measured | Intensity Total | % Error |
| 50 | 848 | 840 | 1 |
| 200 | 838 | 840 | 0.2 |
| Spectrum 2 | | | |
| m/z | Intensity Measured | Intensity Total | % Error |
| 100 | 1703 | 1680 | 1.3 |
| 200 | 1678 | 1680 | 0.1 |

Fig. 21

FUNCTION SWITCHING WITH FAST ASYNCHRONOUS ACQUISITION

CROSS REFERENCE TO RELATED APPLICATIONS

This application is the National Stage of International Application No. PCT/GB2012/050875, filed 20 Apr. 2012, which claims priority from and the benefit of U.S. Provisional Patent Application Ser. No. 61/478,718 filed on 25 Apr. 2011 and United Kingdom Patent Application No. 1106689.1 filed on 20 Apr. 2011 . The entire contents of these applications are incorporated herein by reference.

BACKGROUND OF THE INVENTION

The present invention relates to a method of data acquisition and processing of mass spectral data and a mass spectrometer.

In existing state of the art mass spectrometers an additional short time interval is allocated between spectral acquisition periods during which time interval no data is acquired or stored. During this time interval the state or mode of the system may be changed and the system allowed to equilibrate. This equilibration can consist of allowing power supplies to settle and allowing populations of ions within the mass spectrometer to exit etc.

Changing of the mode of operation is generally synchronized to the start of the inter scan period or time interval. This approach ensures that ions associated with the first mode of operation do not appear in a mass spectrum relating to the second mode of operation. This mixing of ion populations is often referred to as crosstalk. However, synchronization involves complex instrument control and, to ensure no crosstalk between modes, the inter scan period or time interval may be longer than that required to simply change the system parameters from one mode to another. This reduces the duty cycle for the acquisition of data.

U.S. Pat. No. 6,111,250 discloses a method of reducing the pause time required to allow a collision gas cell to drain of ions between introductions of precursor ions with differing mass to charge ratio values. The synchronized pause time is present to ensure minimum crosstalk.

Examples of acquisitions where the mode or state of the mass spectrometer is changed during an acquisition include: switching between different precursor ions during an MS-MS experiment, switching between different CID collision energies and switching from positive to negative ion operation, etc.

It is desired to provide an improved method of data acquisition, an improved method of mass spectrometry and an improved mass spectrometer.

SUMMARY OF THE INVENTION

According to an aspect of the present invention there is provided method of analysing a sample comprising:

operating a mass spectrometer in a state or mode wherein first ions are analysed;

switching a state or mode of the mass spectrometer so that second ions are analysed;

acquiring a stream of mass spectral data wherein the acquisition of the mass spectral data is substantially asynchronous with and/or is not synchronised with the switching of the mass spectrometer between states or modes; and post-processing the stream of mass spectral data to produce: (i) mass spectral data relating to the first ions; and/or (ii) mass spectral data relating to the second ions.

The method preferably further comprises repeatedly switching the mass spectrometer between different states or modes.

The step of switching a state or mode of the mass spectrometer may comprise switching a state or mode or the mass spectrometer substantially abruptly and/or without pausing for a delay period during which delay period the mass spectrometer would otherwise be allowed to equilibrate.

The step of switching a state or mode of the mass spectrometer may comprise changing, switching, altering or varying the composition and/or intensity of a population of ions.

The step of switching a state or mode of the mass spectrometer may comprise switching the polarity of an ion source.

The step of switching a state or mode of the mass spectrometer may comprise fragmenting or reacting parent ions to produce fragment or product ions.

The step of switching a state or mode of the mass spectrometer may comprise switching the transmission characteristics of a mass, mass to charge ratio, ion mobility or differential ion mobility filter or separator.

The step of switching a state or mode of the mass spectrometer may comprise selecting a different species of parent or precursor ion.

The step of switching a state or mode of the mass spectrometer may comprise selecting a different Collision Induced Dissociation collision energy.

The step of switching a state or mode of the mass spectrometer may comprise selecting a different fragmentation or reaction state of the mass spectrometer so that different ions are fragmented or reacted and/or ions are fragmented or reacted to different degrees.

The step of switching a state or mode of the mass spectrometer may comprise switching or altering an operational parameter of the mass spectrometer.

The stream of mass spectral data which is acquired is preferably substantially continuous.

The step of acquiring a stream of mass spectral data preferably comprises continuously acquiring a stream of mass spectral data.

The step of acquiring a stream of mass spectral data preferably comprises substantially continuously acquiring mass spectral data without dividing a mass spectral data acquisition period into a plurality of mass spectral data acquisition windows separated from each other by an equilibration delay time period during which time period: (i) no mass spectral data is acquired; and/or (ii) the mass spectrometer is allowed to equilibrate; and/or (iii) the mass spectrometer is switched between states or modes.

The step of acquiring a stream of mass spectral data preferably comprises substantially continuously acquiring mass spectral data without pausing the acquisition of the mass spectral data immediately before and/or during and/or immediately after a state or mode of the mass spectrometer has been switched.

According to an embodiment the method further comprises:

repeatedly switching the mass spectrometer between a first state or mode and a second state or mode, wherein the mass spectrometer is in the first state or mode for a time T1 and is in the second state or mode for a time T2;

wherein the stream of mass spectral data is continuously acquired over a time period>T1 and >T2.

According to an embodiment the method further comprises: operating the mass spectrometer in a first state or mode wherein the first ions are analysed during a first time period t1-t2;

switching the state or mode of the mass spectrometer to a second state or mode wherein the second ions are analysed during a second time period t2-t3 immediately following the first time period;

operating the mass spectrometer in the second state or mode during a third time period t3-t4 immediately following the second time period; and continuously acquiring mass spectral data during the first, second and third time periods t1-t4.

According to an embodiment the method further comprises mass analysing the first ions and/or the second ions.

The method preferably further comprises mass analysing the first ions and/or the second ions using an orthogonal acceleration Time of Flight mass analyser, a quadrupole mass analyser or a Fourier Transform mass analyser.

According to an embodiment during a single mass spectral data acquisition period a state or mode of the mass spectrometer is switched a plurality of times.

Preferably, a state or mode of the mass spectrometer is repeatedly switched with a frequency f1 and wherein mass spectral data is acquired during acquisition periods with a frequency f2, wherein f2<f1.

The stream of mass spectral data is preferably acquired substantially independently of any switching of a state or mode of the mass spectrometer.

According to an embodiment:

the stream of mass spectral data is acquired during a mass spectral data acquisition period; and the acquisition period is substantially asynchronous with and/or is not synchronised with the switching of the mass spectrometer between states or modes.

The start and/or end time of the acquisition period is preferably substantially asynchronous with and/or is not synchronised with the switching of the mass spectrometer between states or modes.

The stream of mass spectral data is preferably acquired during a mass spectral data acquisition period;

the acquisition period preferably comprises a plurality of sample periods; and the sample periods are substantially asynchronous with and/or are not synchronised with the switching of the mass spectrometer between states or modes.

The start and/or end times of the sample periods are preferably substantially asynchronous with and/or are not synchronised with the switching of the mass spectrometer between states or modes.

A state or mode of the mass spectrometer is preferably repeatedly switched with a frequency f1 and wherein the sample periods have a frequency f3, wherein f3>f1.

The step of post-processing the stream of mass spectral data preferably comprises detecting ion peaks in the stream of mass spectral data and determining a plurality of ion peak times and a plurality of ion peak intensities associated with the stream of mass spectral data.

The step of post-processing the stream of mass spectral data preferably comprises determining which portions or sample periods of the stream of mass spectral data relate to the first ions or to the second ions.

The step of post-processing the stream of mass spectral data preferably comprises determining which portions or sample periods of the stream of mass spectral data relate to both the first ions and to the second ions, and rejecting those portions or sample periods.

The step of post-processing the stream of mass spectral data preferably comprises producing a mass spectrum for (i) the first ions and/or (ii) the second ions by combining portions or sample periods of the stream of mass spectral data determined to relate to the first ions and/or by combining portions or sample periods of the stream of mass spectral data determined to relate to the second ions.

The step of post-processing the stream of mass spectral data preferably comprises producing reconstructed mass chromatograms for ion peaks appearing in the stream of mass spectral data.

According to an embodiment the method further comprises deconvoluting each of the mass chromatograms and determining one or more deconvoluted chromatogram peaks associated with each of the mass chromatograms.

The step of deconvoluting each of the mass chromatograms preferably comprises determining or approximating a point spread function characteristic of chromatogram peaks in the mass chromatograms.

The method preferably further comprises determining which of the deconvoluted chromatogram peaks relate to the first ions and/or determining which of the deconvoluted chromatogram peaks relate to the second ions.

According to an embodiment the method preferably further comprises producing a mass spectrum for (i) the first ions and/or (ii) the second ions by combining the deconvoluted chromatogram peaks determined to relate to the first ions and/or by combining the deconvoluted chromatogram peaks determined to relate to the second ions.

According to an aspect of the present invention there is provided a mass spectrometer comprising:

a control system arranged and adapted:

(i) to operate a mass spectrometer in a state or mode wherein first ions are analysed;

(ii) to switch a state or mode of the mass spectrometer so that second ions are analysed;

(iii) to acquire a stream of mass spectral data wherein the acquisition of the mass spectral data is substantially asynchronous with and/or is not synchronised with the switching of the mass spectrometer between states or modes; and (iv) to post-process the stream of mass spectral data to produce: (a) mass spectral data relating to the first ions; and/or (b) mass spectral data relating to the second ions.

The preferred embodiment is concerned with improving the data collection duty cycle for experiments in which the operational state or mode of a mass spectrometer is changed during an analysis. This improvement is affected by switching the state or mode of the instrument asynchronously with respect to the spectral acquisition time interval and using qualitative and quantitative aspects of the acquired data and/or knowledge of the time at which the change occurred to isolate data from each mode.

The preferred embodiment allows the operational mode of the mass spectrometer to be switched more often or more rapidly resulting in an improved duty cycle.

The preferred method involves no synchronization and therefore no complex instrument control. In addition, the duty cycle may be improved over conventional mass spectrometers at fast scan speeds.

The preferred embodiment solves the problem of (relatively) poor data acquisition duty cycle which is inherent in conventional mass spectrometers. The relatively poor duty cycle arises due to a pause or inter scan period between switching modes of operation or the state of a mass spectrometer, during which time period no data is recorded. This pause or inter scan period is introduced to prevent mixing or crosstalk between ions resulting in spectra containing ions related to more than one state of the mass spectrometer.

According to the preferred embodiment this inter scan period is preferably removed and is preferably redundant enabling the control and timing electronics of the mass spectrometer to be significantly simplified and which also results in the duty cycle for switching experiments being improved.

An analogous technique is employed to differentiate ions from different chemical species eluting from a chromatographic column. In this case, species are separated by chromatography before ionization and the characteristic intensity elution profile of each ion is used to de-convolute ions originating from different species from one another. However, in this case no attempt is made to use the data to determine when the state of the mass spectrometer has been changed. Instead, pause times or inter scan periods are commonly used to demark or separate data taken using different mass spectrometer states.

The preferred embodiment improves upon known techniques by removing the need for a preset pause time or inter scan period. This negates the need for complex control electronics to synchronize the start and end of acquisitions with the time at which operational parameters of the system are changed.

BRIEF DESCRIPTION OF THE DRAWINGS

Various embodiments of the present invention will now be described, by way of example only, and with reference to the accompanying drawings in which:

FIGS. 14A-B shows a table showing details of scan number and intensity for ions having five different mass to charge ratios;

FIG. 18 shows the total summed intensities of each of the product ion peaks in the two product ion spectra of FIGS. 15A-B that would be measured using prior art techniques;

FIG. 21 shows the total summed intensities of each of the product ion peaks in the two product ion spectra of FIGS. 15A-B measured according to the preferred embodiment of the present invention.

DETAILED DESCRIPTION OF THE PREFERRED EMBODIMENTS

A preferred embodiment of the present invention will now be described. In one embodiment of the invention, the method may be applied to the rapid switching between precursor ions subsequently fragmented in a collision cell of a mass spectrometer to produce a series of product ion spectra. This mode of operation is preferably implemented using an orthogonal acceleration Time of Flight mass spectrometer and will now be described in more detail as an example of the preferred embodiment.

It should be understood that the preferred embodiment may also be used in other applications where the mode of operation of a mass spectrometer is switched resulting in a different population of ions being analysed.

Figure 1:
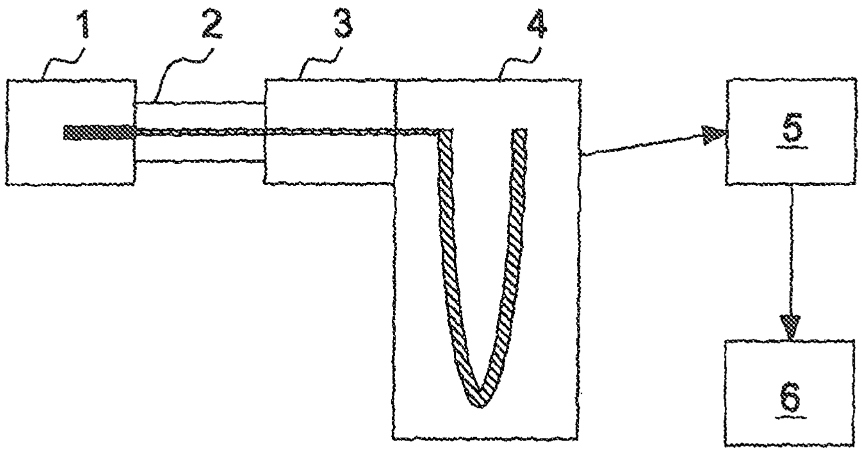
FIG. 1 shows a quadrupole Time of Flight mass spectrometer according to an embodiment of the present invention at a first time.

FIG. 1 shows a schematic diagram of a quadrupole Time of Flight mass spectrometer. Ions are produced in an ion source 1 and are transferred to an analytical quadrupole 2. The quadrupole mass filter 2 may be set to transmit ions having a narrow range of mass to charge ratio values by the selection of RF frequencies and amplitudes and the addition of auxiliary resolving DC voltages and/or auxiliary AC excitation voltages. Ions having a first mass to charge ratio range or set mass M1 pass through the quadrupole mass filter 2 and are fragmented by, for example, collisionally induced dissociation in a gas filled collision cell 3. The collision cell 3 may be maintained at a pressure of $10^{-3}$-$10^{-2}$ mbar. Product ions, and remaining precursor ions, are then transmitted to a Time of Flight mass analyser 4 where they are mass analysed. The progress of the ions through the mass spectrometer is indicated by the hatched line.

Signal detected by the Time of Flight mass analyser 4 is passed to a data recording device 5. This may, for example, comprise a Time to Digital Converter ("TDC") or an Analogue to Digital Converter ("ADC"). Data from multiple time of flight separations is preferably summed into a mass spectrum over a defined period of time. This mass spectrum may be stored in fast memory situated locally within the TDC or ADC electronics. When the spectrum is complete the mass spectrum may be sent to a separate computer 6 and stored, for example, to a hard disk for subsequent post processing.

According to the preferred embodiment it is desirable that the rate of acquisition of mass spectra or the time interval over which each mass spectrum is acquired is of a similar order or faster than the rate at which the composition of the ion beam changes. To realize fast acquisition rates, acquisition architectures may be implemented whereby data from one or more mass spectra are transferred from the TDC or ADC 5 to the computer 6 at the same time that subsequent one or more mass spectra are acquired and stored within local fast memory within the TDC or ADC electronics. In this way a continuous consecutive stream of mass spectra at a high repetition rate with negligible data loss between spectra can preferably be generated.

As this stream of mass spectra is being generated, the mass range set to be transmitted by the quadruple mass filter 2 is preferably rapidly changed from set mass M1 to a second set mass M2.

At this time ions of mass range M1 will still exist within regions of the mass spectrometer downstream of the quadrupole 2.

Figure 2:
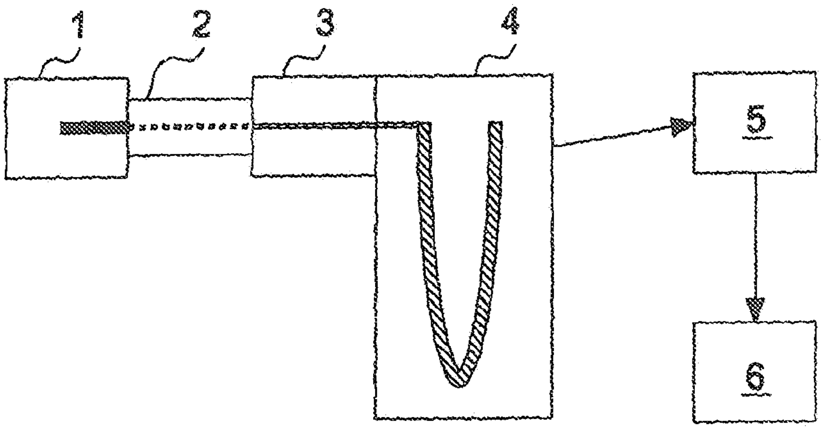
FIG. 2 shows a quadrupole Time of Flight mass spectrometer according to an embodiment of the present invention at a second later time.

FIG. 2 shows the same schematic as in FIG. 1 but at a time just after the quadrupole set mass has been rapidly changed. Ions from set mass M1 are shown as a hatched line. Ions from set mass M2 are shown as a dotted line.

The population of ions from set mass M1 will take a period of time to completely travel through the mass spectrometer. Particularly, the time taken to traverse the gas filled collision cell region 3 may be in the order of tens of ms because collisions with the gas in this region significantly slow the ion transit time. Ions may be urged through this region using static or transient DC potentials or RF pseudo potentials, reducing the transit time to less than 10 ms.

At the time depicted in FIG. 2, ions from set mass M1 are still being mass analysed and recorded.

In addition to ions of set mass M1, ions of set mass M2 are simultaneously travelling through the mass spectrometer. Ions of other masses than set by M1 and M2 may also be present. These ions will have passed through the quadrupole 2 during the time that the RF and DC voltages of the quadrupole 2 were driven from transmitting M1 to transmitting M2.

In state of the art quadrupole mass filters the set mass of the quadrupole may be changed at a rate of around 10,000-20,000 AMU per second.

Figure 3:
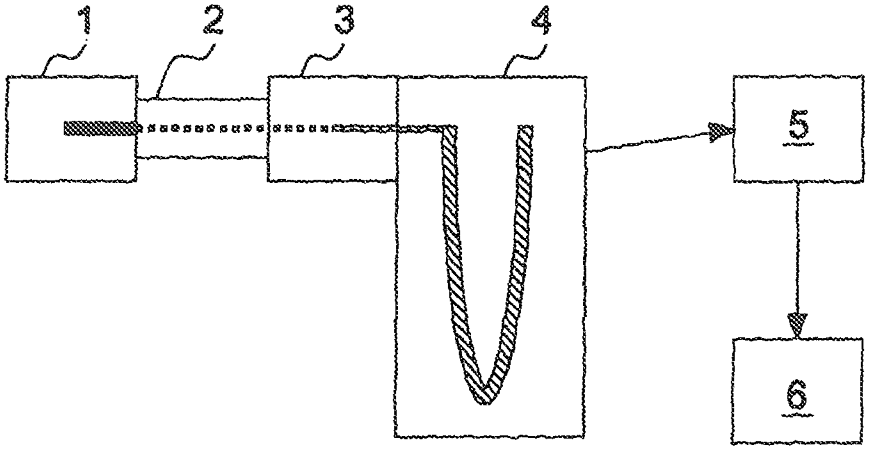
FIG. 3 shows a quadrupole Time of Flight mass spectrometer according to an embodiment of the present invention at a third subsequent time.

FIG. 3 shows the same schematic as in FIG. 2 at a slightly later time. Ions of set mass M1 and M2 are travelling through the collision cell region 3. As these ions traverse the collision cell 3, diffusion within the collision cell 3 causes the two populations to mix or overlap.

In conventional mass spectrometers such mixing or overlapping would be a dominant cause of crosstalk in the final data and is the main reason why a pause time or inter scan delay period is routinely used in experiments of this type. Ions generally take relatively more time to traverse this region, as their kinetic energy is reduced by collisions with background gas molecules. Ions will traverse the generally lower pressure regions downstream of the collision gas cell 3 in a relatively shorter time period. As the time of flight through these downstream regions depends on the mass to charge ratio of the species exiting the collision cell 3 it is possible that overlap or mixing may occur downstream of the gas cell 3.

If the quadrupole mass filter 2 is switched between transmitting several different precursor ions in rapid succession, then product ions from several precursors may be present within the collision gas cell 3 simultaneously as they travel towards the mass analyser 4.

Figure 4:
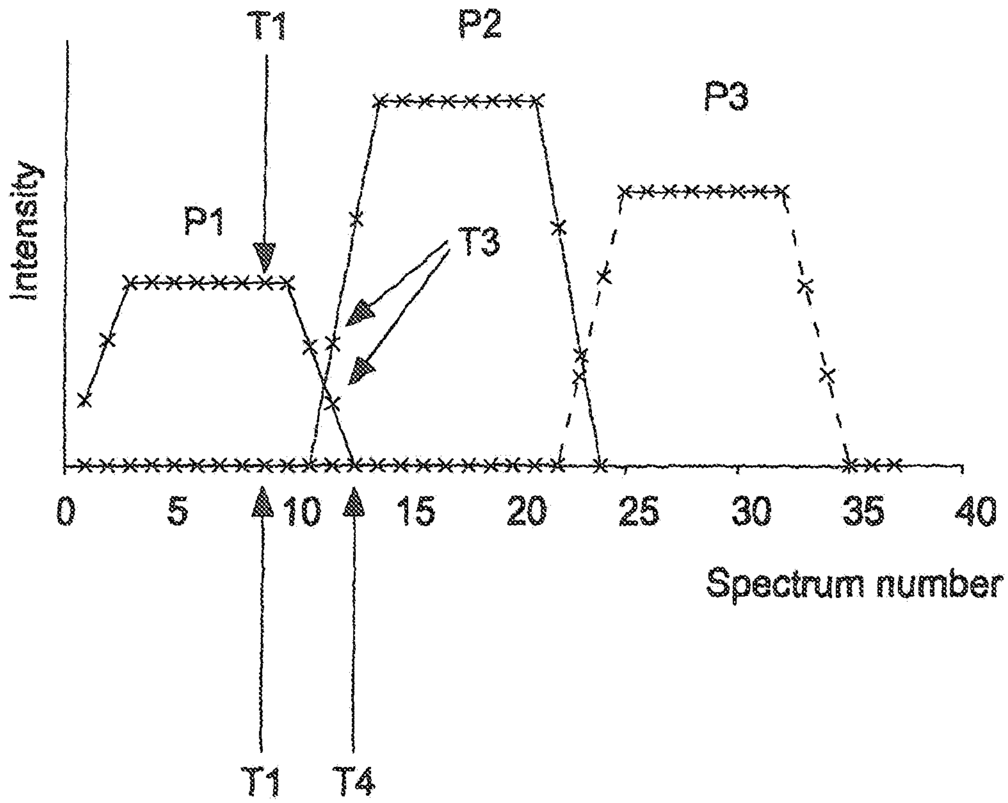
FIG. 4 shows a representation of the data produced by the preferred embodiment for three different precursor ions.

FIG. 4 shows a representation of the data produced by the preferred method when the quadrupole mass filter 2 is switched between three different precursor ion having different mass to charge ratio values. According to the preferred embodiment, the MS-MS spectrum of each precursor ion may be extracted by post processing without precise prior knowledge of when the quadrupole mass filter 2 was switched.

The line labeled P1 represents a reconstructed mass chromatogram of a narrow mass to charge ratio region isolating a specific product ion having a mass to charge ratio value P1 originating from a first precursor ion M1 selected using the quadrupole mass filter 2. Product ion P1, in this example, is unique to the product ion spectrum of the first precursor ion M1. The lines labeled P2 and P3 represent reconstructed mass chromatograms of product ions originating from precursor ions M2 and M3, which have different mass to charge ratio values than M1.

In FIG. 4 each data point marked with a cross represents a full time of flight mass spectrum. At time T1 the set mass of the quadrupole 2 is switched from transmitting M1 to transmitting M2. The switching time T1 is asynchronous to the start and end time of the acquisition of an individual spectrum. The reduction in intensity of the product ion P1 from precursor ion M1 recorded by the data recording device 5 occurs some time later as ions continue travelling through the collision gas cell 3 to the mass analyser 4. The increase in intensity of product ion P2 originating from precursor ion M2 also starts some time after the quadrupole 2 is switched. The mass spectrum recorded at T3 will contain product ions originating from precursor ions M1 and M2 and may be excluded from the final product ion spectra of M1 and M2.

As an example, a case may be considered in which M1=200 and M2=300, P1=100 and P2=150, with a spectral acquisition time of 2 ms (500 spectra/second) and a quadrupole set mass dwell time at each precursor ion mass to charge ratio value of 50 ms. At time T3 a single 2 ms spectrum would contain product ions from both M1 and M2. Given an uncertainty of +/−one spectrum in locating this transition point, 50 precursor ions may be analysed per second with a 4 ms region of data excluded due to crosstalk at each transition point.

The utility of the preferred method relies firstly on the speed of acquisition being adequate compared to the speed of switching, and secondly on the effectiveness of the post processing method used to differentiate signals belonging to each ion population.

The optimum post processing method will depend on the nature of the mass spectrometer and on the nature of the data. In the example given using a Time of Flight mass spectrometer, individual mass chromatograms may be correlated, by statistical or Bayesian approaches, to group ions having similar time-intensity profiles. Knowledge of the exact mass measurement capabilities, mass resolution and even isotope ratio information, for example, may also be used as part of the post processing method. Many peak detection and/or de-convolution algorithms are known which are applicable to post processing this data.

In addition, there may be some prior knowledge of the time at which the state of the mass spectrometer is changed, the delay between the change and the signal response at the detector, the duration at which the mass spectrometer remains at each state, and the intensity profile of signals before and/or during a switch. Using fast electronics it is possible to add a flag or marker within an individual spectrum to indicate that a change has occurred. This marker along with any other prior knowledge may then be used to improve the accuracy of the detection or de-convolution of the data.

Various further embodiments are contemplated. The spectral acquisition times (sample periods) do not have to have the same duration. For example, if the time at which each switch occurs is approximately known it may be more efficient to acquire data at a lower spectral rate over a time period where it is assumed that no mixing of ions is likely. Fast acquisition rates are only required to allow the periods when mixing or crosstalk can occur to be detected or de-convoluted.

It is also possible to use the preferred method in other applications where fast switching of operational parameters occurs. Analyses involving the acquisition of full mass spectral information are particularly favorable as unique information within the mass spectra assists in locating the transition areas.

To illustrate aspects of the preferred embodiment a mixture of Leucine Enkephalin [M+M]=556.3 and Reserpine $[M+H]^+=609.3$ was infused in an electrospray positive ionisation mode into an IMS enabled quadrupole orthogonal acceleration Time of Flight mass spectrometer.

A signal generator was used to vary the set mass of a quadrupole rod mass analyser in resolving mode with a 3 Da precursor isolation window between transmission of the molecular ions of Leucine Enkephalin and Reserpine. A fixed collision energy of 23 eV was used to fragment the precursor or parent ions in a Collision Induced Dissociation (CID) ion guide on exit from the quadrupole mass analyser. Travelling or transient DC voltages were applied to electrodes of the ion guide and were used to urge ions continuously through buffer gas filled regions of the CID ion guide and an IMS ion guide. Mass spectral data were acquired continuously and asynchronously to the quadrupole switching at 1000 spectra per second (1 ms per spectrum) with no appreciable delay between individual spectra.

Figure 5:
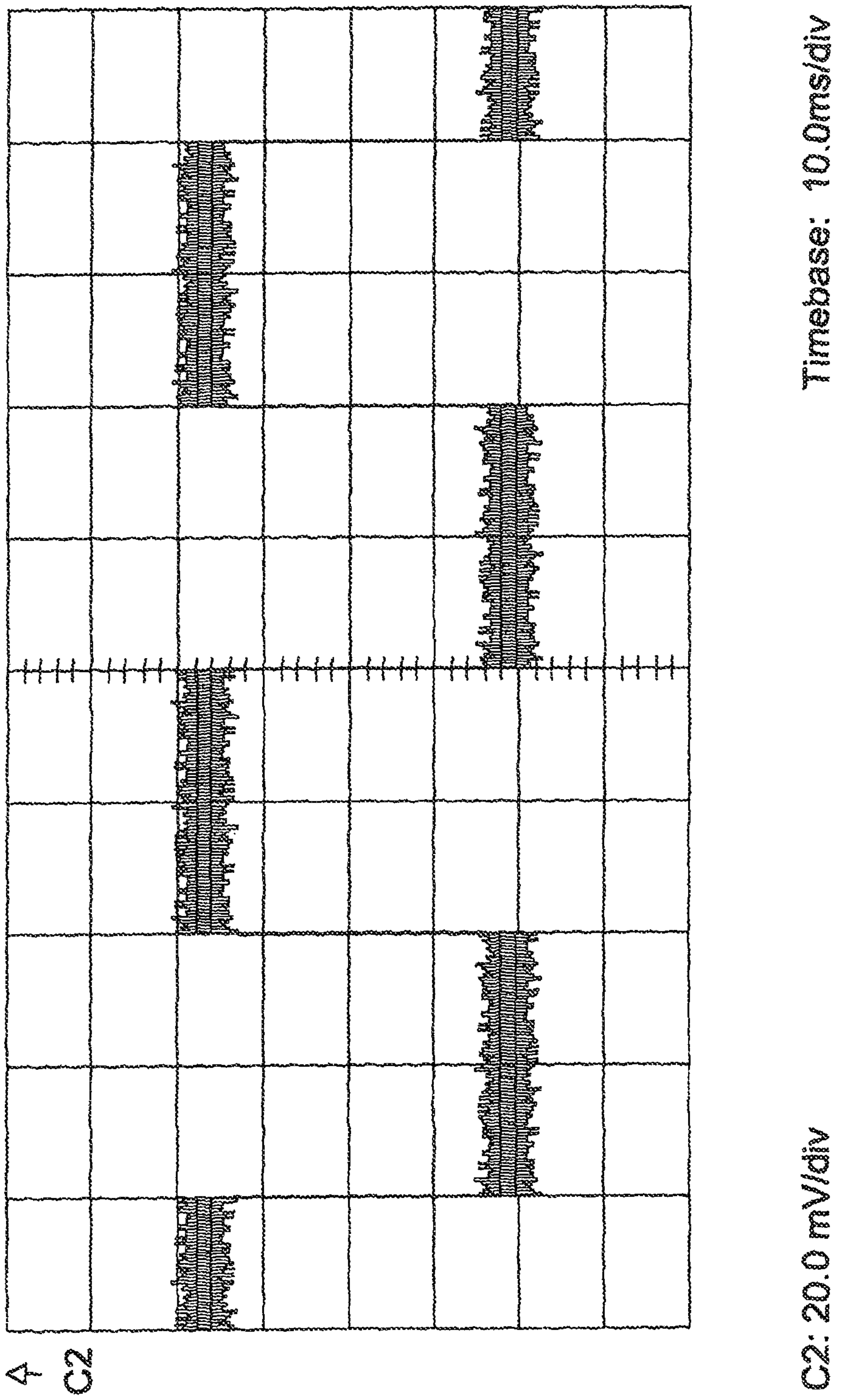
FIG. 5 shows an oscilloscope trace of a reference signal used to drive a quadrupole rod set mass during an acquisition.

FIG. 5 shows an oscilloscope trace of the reference signal used to drive the quadrupole rod set mass during data acquisition. The quadrupole was switched with a 50% duty cycle between the two precursor ions with a 20 ms dwell time at each set mass.

Figure 6:
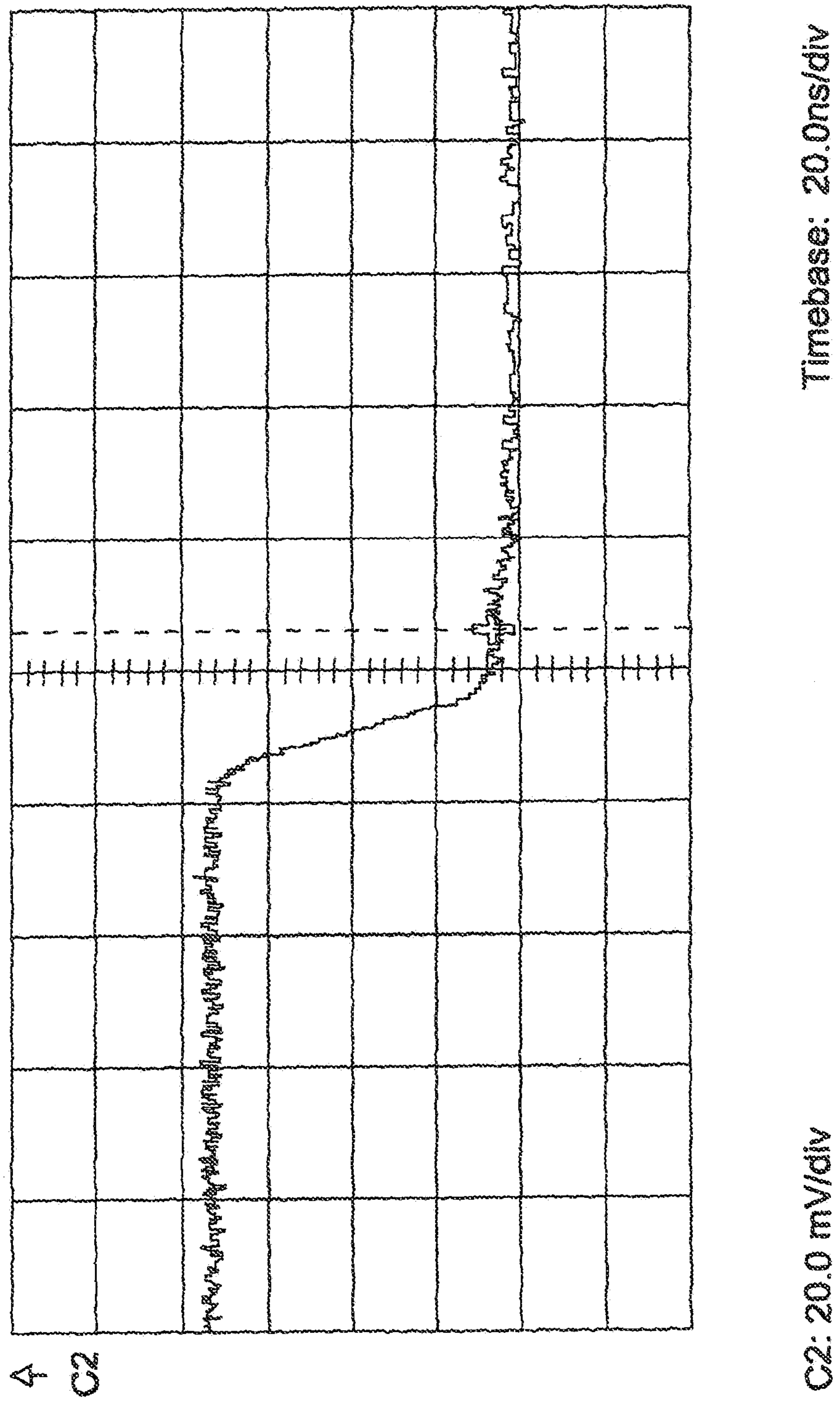
FIG. 6 shows a zoomed region of the signal in FIG. 5 and shows the transition between two set masses.

FIG. 6 shows a zoomed in region of the signal shown in FIG. 5 showing the transition between the two set masses. The reference signal was driven between the two values in approximately 20 ns.

Figure 7:
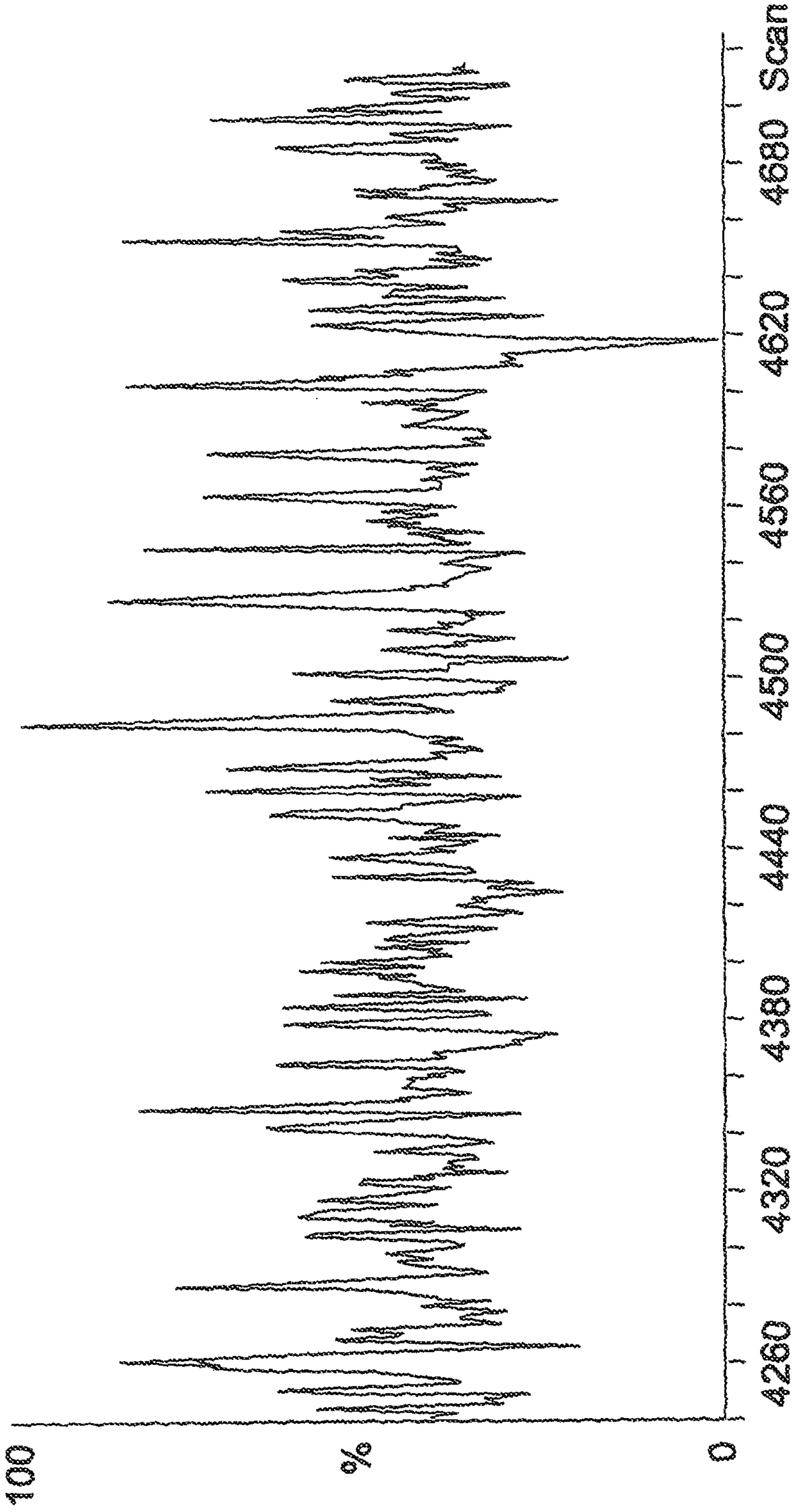
FIG. 7 shows a Total Ion Current chromatogram.

FIG. 7 shows the total ion current (TIC) chromatogram obtained. Each individual scan contains data from 1 ms of data acquisition.

Figure 8A:
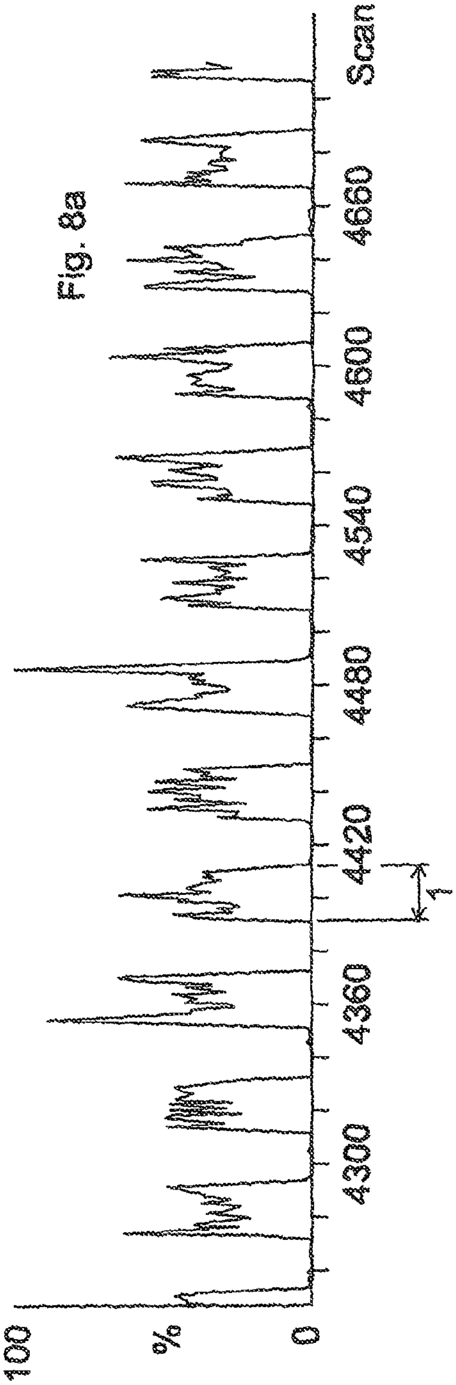
FIG. 8A shows a reconstructed mass chromatogram of a major fragment of Leucine Enkephalin at m/z 221 and FIG. 8B shows a reconstructed mass chromatogram of a major fragment of Reserpine at m/z 195.
Figure 8B:
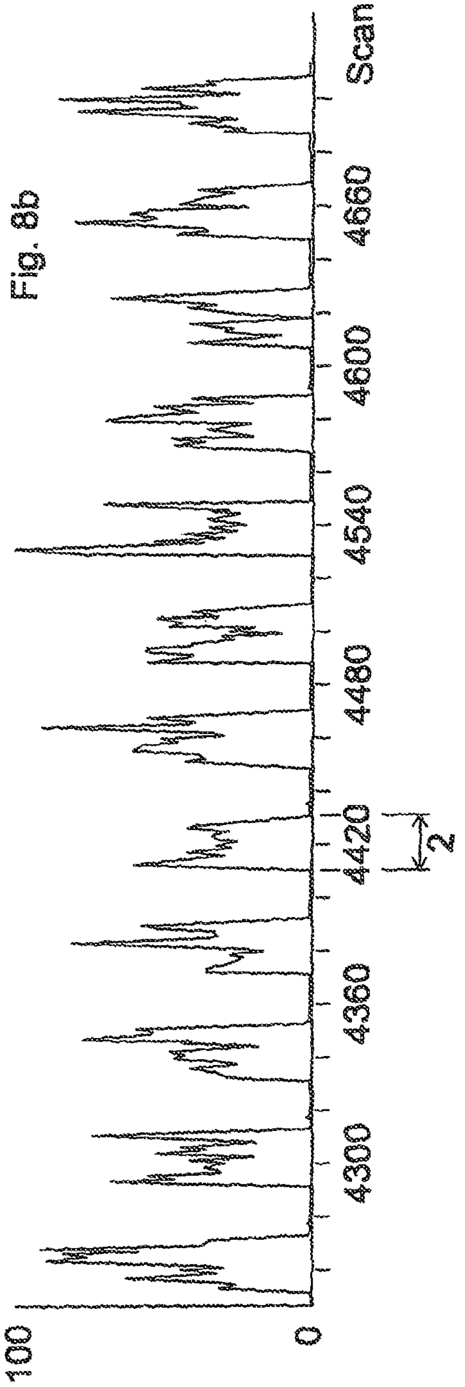

FIG. 8A shows a reconstructed mass chromatogram of a major fragment of Leucine Enkephalin having a mass to charge ratio of 221. FIG. 8B shows a reconstructed mass chromatogram of a major fragment of Reserpine having a mass to charge ratio of 195.

The rising edge of the chromatograms for each transition is in the order of 1 ms. This indicates very fast settling of the quadrupole set mass between transitions. Very little residual crosstalk is apparent between the traces shown. Each of the ions is only present for the 20 ms dwell time of the quadrupole set mass.

Figures 9A, 9B:
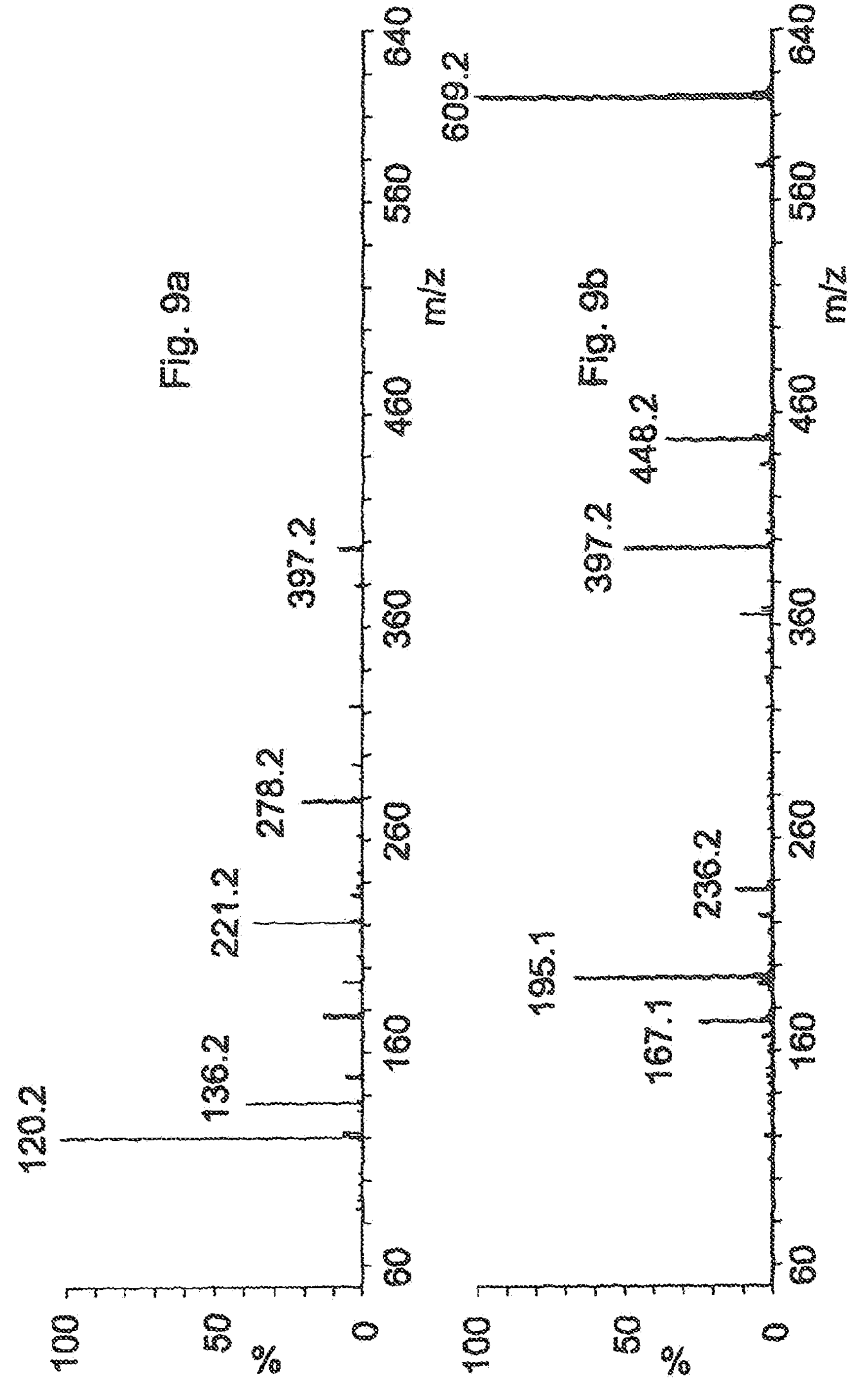
FIG. 9A shows a mass spectrum obtained by combining the spectra from regions 1 as shown in FIG. 8A
FIG. 9B shows a mass spectrum obtained by combining the spectra from regions 2 as shown in FIG. 8B.

FIGS. 9A-B show mass spectra obtained by manually combining the specta from region 1 of FIG. 8A and region 2 of FIG. 8B respectively. At this collision energy the molecular ion of Leucine Enkephalin having a mass to charge ratio of 556 has been completely fragmented and is not present in the mass spectrum shown in FIG. 9A.

Figure 10:
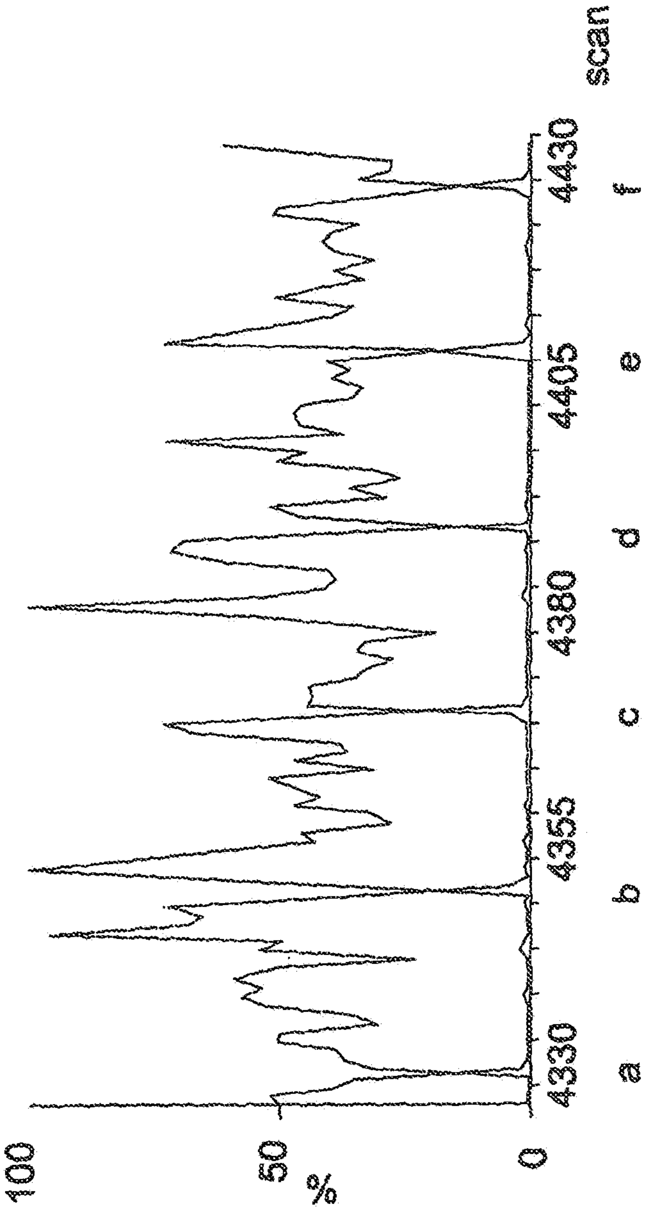
FIG. 10 shows a portion of the data shown in FIGS. 8A-B with the two reconstructed chromatograms overlaid.

FIG. 10 shows a portion of the data shown in FIG. 8 with the two reconstructed chromatograms overlaid. Regions a, b, c, d, e and f show portions of the data where product ions originating from the two precursor ions may be mixed. In most of these cases only a single 1 ms spectrum contains mixed data from both the precursor ions. In some cases no spectrum is obtained with mixed ions. This suggests that very little mixing of the two ion populations is actually occuring in the ion guides or other regions of the mass spectrometer, and that the population of ions is changing within 1 ms.

In this example, only two precursor ions are being monitored by repetitively switching the quadrupole mass analyser between them. In atypical analytical method up to 50 unique precursor ions may be monitored per second under these conditions. As the switching of the quadrupole is not synchronised to the acquisition of data according to the preferred embodiment, the data is preferably post processed to recognise the regions containing data corresponding to each precursor ion, and to produce product ion mass spectra for each precursor or parent ion which are substantially free from mixing or crosstalk. As the order in which the quadrupole set mass is switched is known, the product ion mass spectra may be more easily associated with the relevant precursor or parent ions.

There are several methods which may be used to interrogate the data to determine which product ions correspond to which precursor ions.

For example, the data shown in the example above may be processed using a peak detection algorithm to produce a list of exact mass measurements and scan times. A portion of the data known to encompass product ions originating from at least two different precursor ions may be combined to form a single mass spectrum. In the example above, a 40 ms window (i.e. twice the quadrupole dwell time) may be summed. This portion will contain product ions from at least two different precursor ions.

Reconstructed mass chromatograms may then be constructed for each product ion in the combined spectrum, preferably for those ions above a predetermined intensity threshold. The mass to charge ratio window used in producing the chomatograms is preferably set to reflect the expected precision of the measurements. This results in exact mass chromatograms, allowing a high degree of specificity.

Figure 11A:
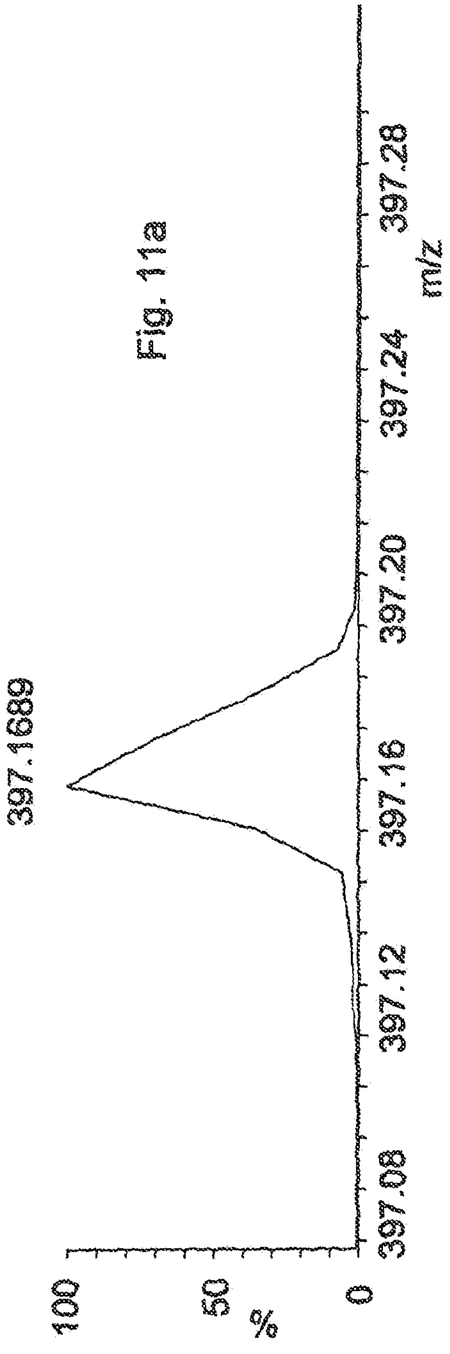
FIG. 11A shows a region of the mass spectrum shown in FIG. 9A around m/z 397 and FIG. 11B shows a region of the mass spectrum shown in FIG. 9B around m/z 397.
Figure 11B:
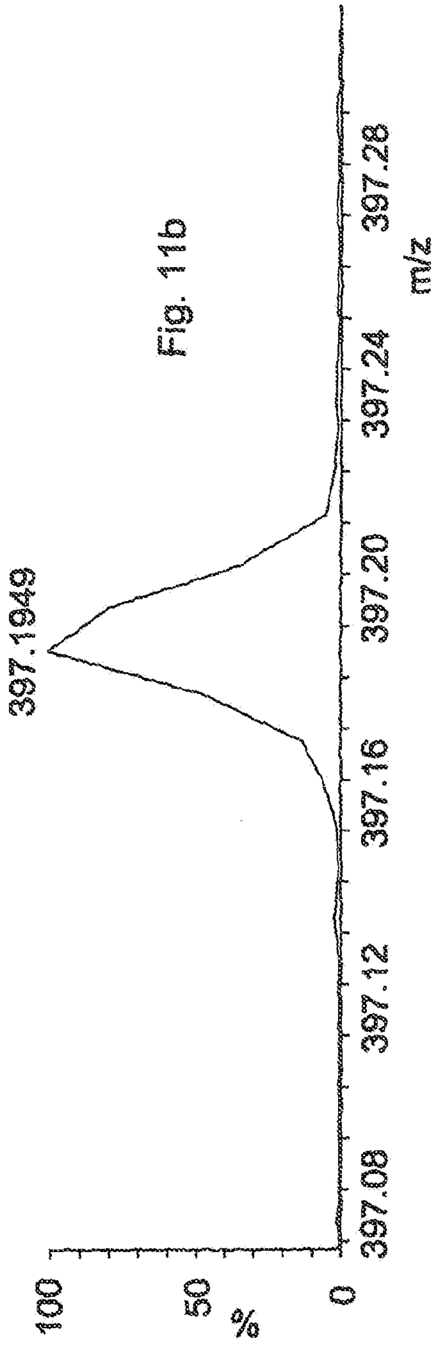

FIGS. 11A-B show regions of the spectra shown in FIGS. 9A-B around a mass to charge ratio value of 397. Both Leucine Enkephalin (FIG. 11A) and Reserpine (FIG. 11B) contain a fragment ion with a nominal mass of 397. However, there is a mass difference of 25.3 mda between these two ions indicating that they have different elemental compositions.

Figure 12A:
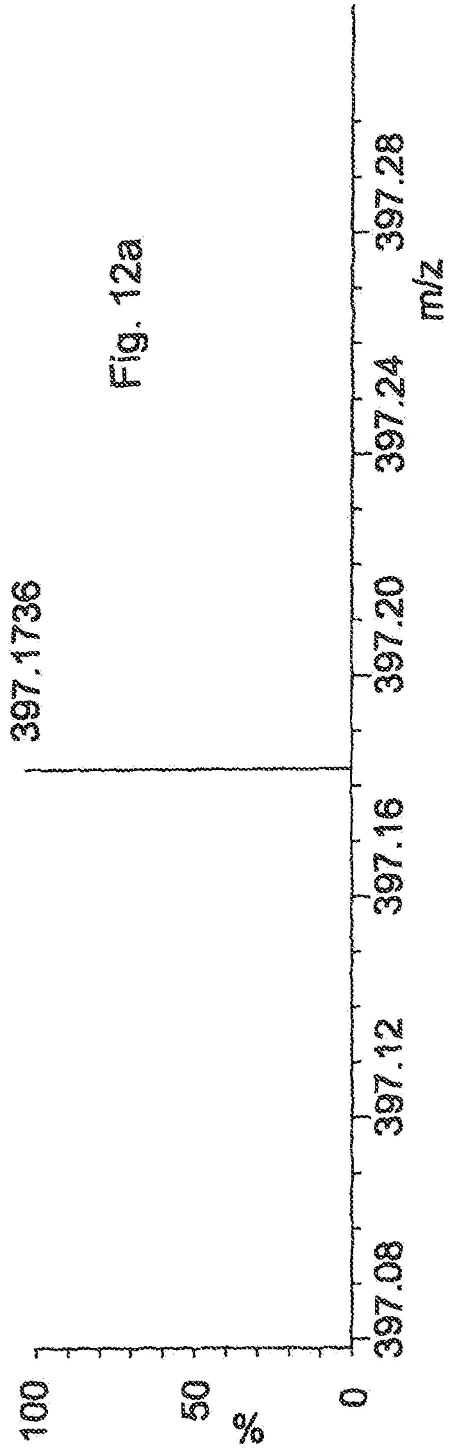
FIG. 12A shows the ion shown in FIG. 11A after peak detection and FIG. 12B shows the ion shown in FIG. 11B after peak detection.
Figure 12B:
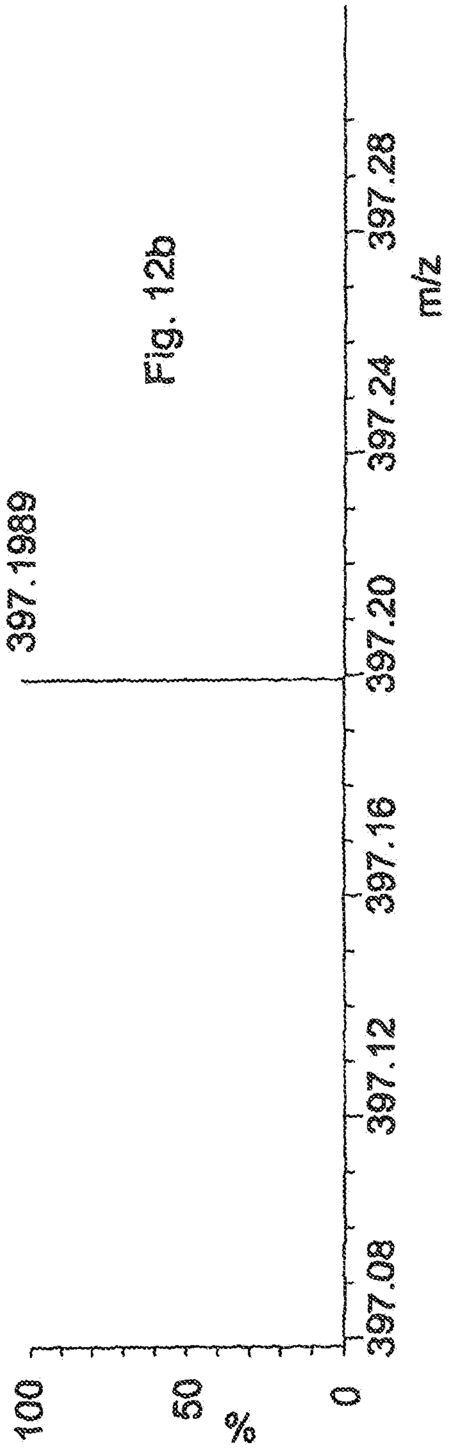
Figure 13A:
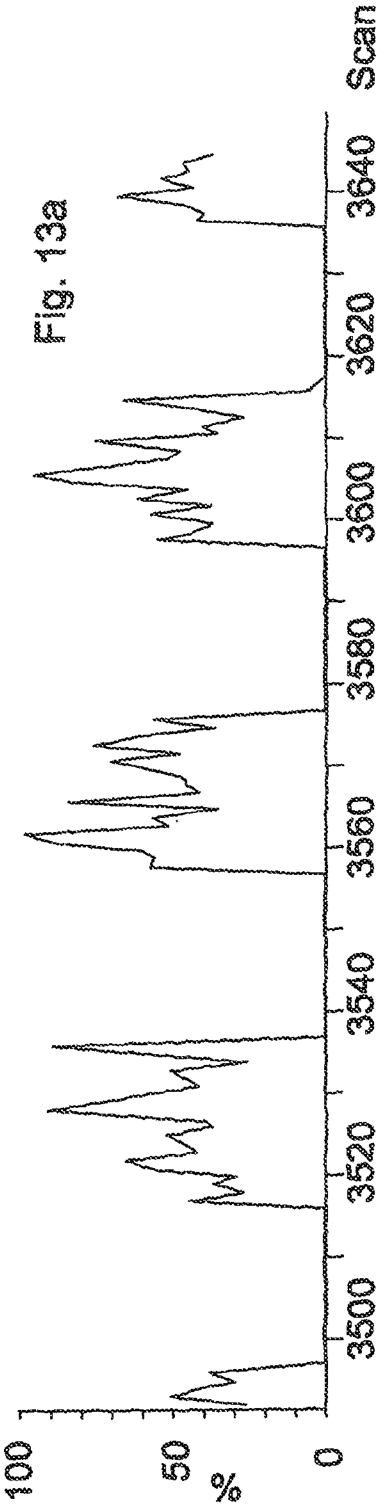
FIG. 13A shows a reconstructed exact mass chromatogram of the ion shown in FIG. 12A
Figure 13B:
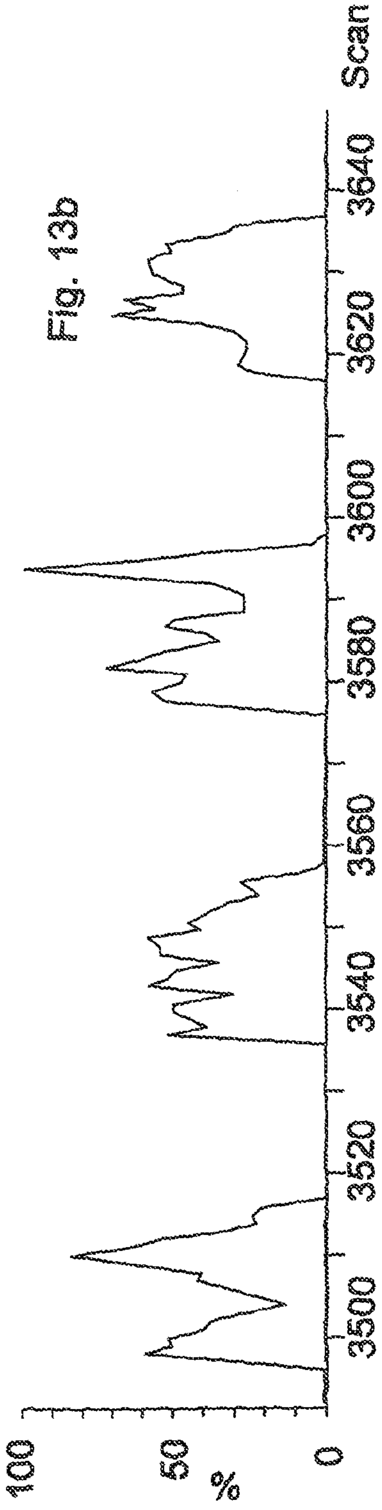
FIG. 13B shows a reconstructed exact mass chromatogram of the ion shown in FIG. 12B.

FIGS. 12A-B shows the same two ions shown in FIGS. 11A-B after peak detection. FIGS. 13A-B show reconstructed exact mass chromatograms produced using a 25 mda window for the two ions shown in FIGS. 12A-B.

From these chromatograms, and from similar chromatograms for each of the other product ions within the combined spectrum, lists of those scans (spectra) which contain detected peaks may be prepared for each of the chromatograms. A fixed or variable intensity threshold may be used to exclude noise or spurious ion events.

These lists, which may include peak intensities, mass to charge ratio values and scan numbers (spectra numbers), may be collated so as to group those peaks which appear in the same spectra or contiguous groups of spectra. Once collated, the peaks may be combined to produce a single mass spectrum for each group of spectra.

This process may be repeated for the next, e.g. 40 ms, portion of the data and the subsequent lists of mass to charge ratio values and scan numbers may be collated in the same way.

FIGS. 14A-B illustrates the method described above. The table shows a list of scan numbers and peak intensities for five mass to charge ratio values from a combined spectrum of scan numbers 3515 to 3554, which encompasses the data from two precursor ions. By examining scans 3518-3536, it is clear that the peaks having mass to charge ratios 397.17 and 221.14 arise from the same precursor ion, since these spectra contain peaks with intensities greater than 100 for both of the ions.

Similarly, by examining scans 3538-3554, it is clear that the peaks having mass to charge ratio values of 397.19, 195.13 and 174.16 all arise from a second precursor ion.

Scans 3517 and 3537 show a level of ambiguity, suggesting that there may be some mixing of ions. One way to deal with this ambiguity would be to simply reject these scans/spectra from the final data.

In this example it is clear that fragment ions unique to each precursor ion are present in every spectrum in each 20 ms group of spectra. However, it is possible that low intensity fragment ions will vary in intensity over each 20 ms period, or even disappear due to statistical variation. One way to deal with this variation is to determine regions of interest using the most intense fragment ion peaks, and then to use these regions to collate all the other peaks regardless of intensity.

According to another embodiment, the fragment ion peaks detected in the combined spectra may be assigned to precursor ion groups by applying an appropriate clustering algorithm (e.g. K-means or soft K-means) to the chromatograms generated.

According to another embodiment, the intensity data is smoothed using, for example, a moving average filter. However this may lead to larger regions of the data where mixing or crosstalk may appear and so reduce the final duty cycle of the experiment.

According to another embodiment, a de-convolution technique may be applied to the data. According to this embodiment, a point spread function is approximated for the expected shape of the reconstructed ion chromatograms generated. Each mass chromatogram is then deconvolved producing a list of time measurements. Any appropriate technique may be used for deconvolution, including Maximum Entropy, Maximum Likelihood and fully probabilistic (or Bayesian) methods. The resulting time measurements may then be grouped or clustered into precursor ion groups.

According to an alternative embodiment, rather than reducing the data to mass intensity pairs before interrogation, as in FIGS. 12A-B, the original continuum data is processed using a two dimensional peak detection algorithm. Intensities are measured on a two dimensional grid of mass to charge ratio and scan number. By applying a suitable filter matched to the expected time (scan number) and mass to charge ratio profiles, the location of each of the data blocks (groups of spectra) may be found. Fragment ion peaks having the same time location may then be collected together to produce a final MS-MS spectrum.

Similarly, the two dimensional data may be subjected to full deconvolution using a two dimensional point spread function (preferably a function of mass to charge ratio and time). Again a wide variety of deconvolution methods are available.

Other methods of post processing the data are also contemplated.

To further illustrate the preferred method, a simple model system will now be discussed.

Figure 15A:
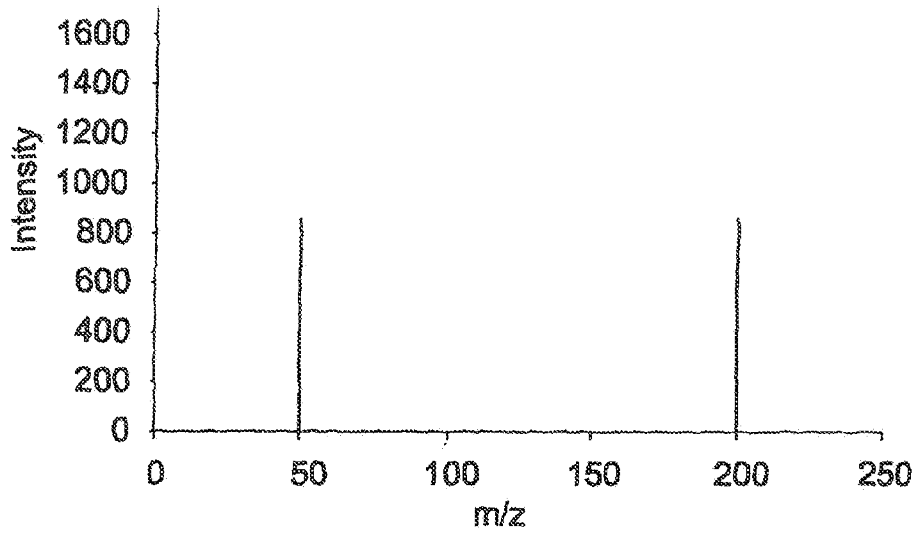
FIGS. 15A-B show theoretical centroid mass spectra representing the product ions from two different precursor ions.
Figure 15B:
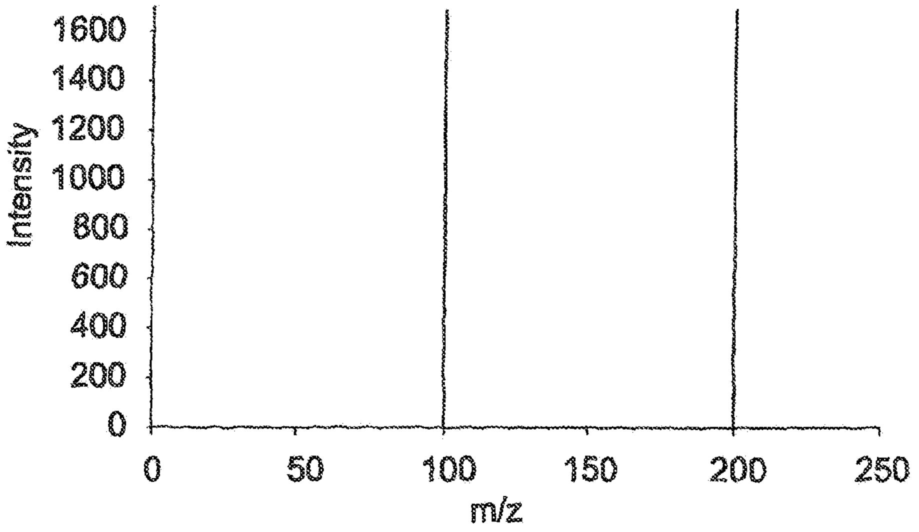

FIGS. 15A-B show theoretical centroid mass spectra representing the product ions from two different precursor ions. It can be seen that both spectra contain a common product ion peak at m/z=200, however the intensity of the peak in FIG. 15B is twice the intensity of the peak in FIG. 15A. The experiment described in the example above, where a quadrupole set mass is repeatedly switched between two precursor ions asynchronously with respect to the acquisition or spectral time interval, may give rise to the product ion spectra shown in FIGS. 15A-B.

Figure 16A:
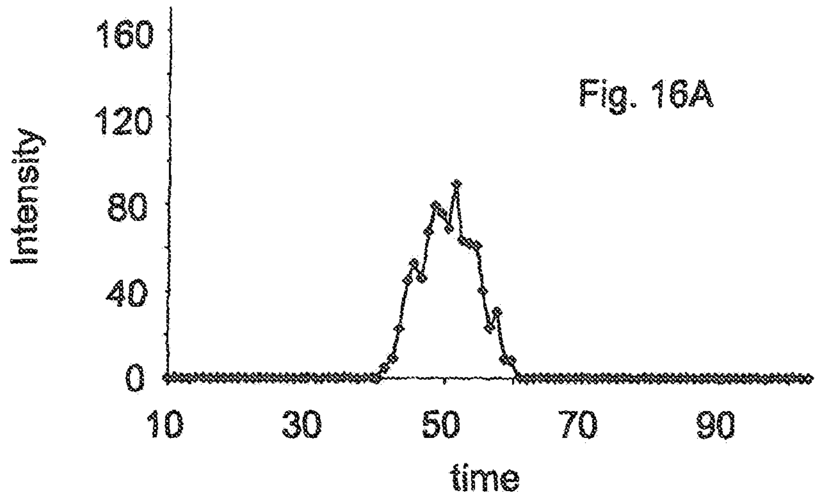
FIGS. 16A-C show theoretical reconstructed mass chromatograms of the product ion peaks at m/z=50, m/z=200 and m/z=100.
Figure 16B:
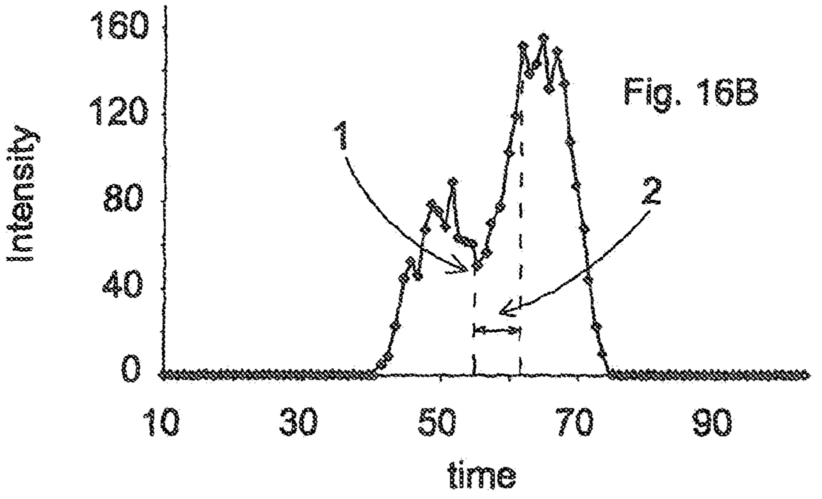
Figure 16C:
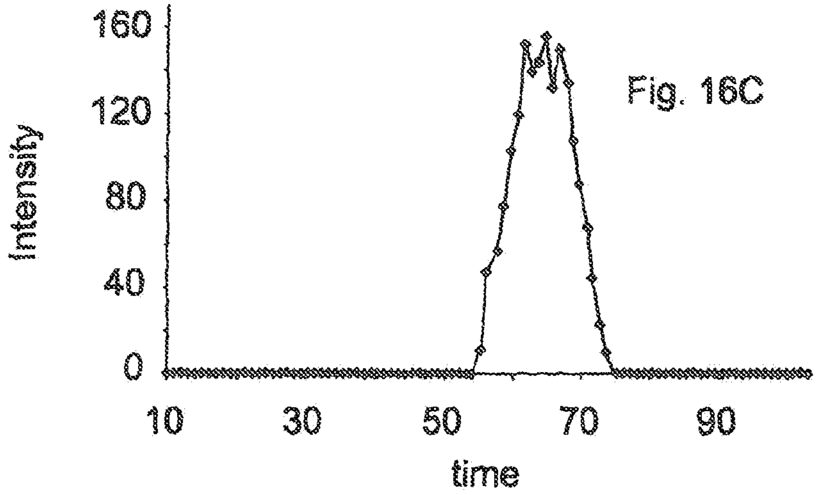

FIGS. 16A-C show theoretical reconstructed mass chromatograms of the product ion peaks at m/z=50 (FIG. 16A), m/z=200 (FIG. 16B), and m/z=100 (FIG. 16C). Poisson noise has been added to the signals to emulate ion statistical intensity fluctuation.

The reconstructed mass chromatograms of the product ion peaks at m/z=50 and m/z=100 result in single chromatographic peaks centered at different times, which may be clearly and unambiguously determined to belong to the precursor ions which produced the product ion spectra in FIG. 15A and FIG. 15B, respectively.

However, the chromatogram for the product ion peak at m/z=200 shows two chromatographic peaks at times corresponding to both precursor ions which produced the product ion spectra in FIGS. 15A-B.

Figure 17:
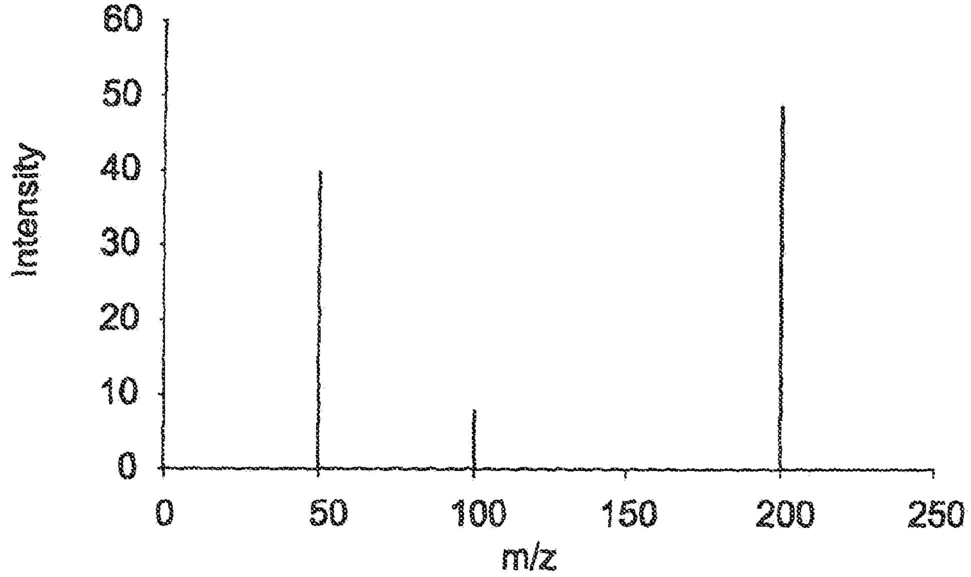
FIG. 17 shows a mass spectrum taken at time 55 as indicated by 1 in FIG. 16B.

FIG. 17 shows the mass spectrum taken at time 55, indicated by 1 in FIG. 16B. At this time, a mixed spectrum including product ions originating from both precursor ions is acquired.

As described above, according to prior art techniques, in order to make sure that any mixing of the two product ion spectra is avoided, a pause time or inter scan delay time is used. In this example, a time period corresponding to the spectra at times 53-61 (indicated by 2 in FIG. 16B) would typically be used. Over the duration of this period no data would be acquired, and any product ions (corresponding to any of the peaks at m/z=50, m/z=100 or m/z=200) arriving at the detector in this period would be lost.

FIG. 18 shows the total summed intensities of each of the product ion peaks in the two product ion spectra (corresponding to the spectra in FIGS. 15A-B) that would be measured using the prior art technique. Those ions arriving during the time period indicated by 2 in FIG. 16B have been excluded from the intensities to ensure that no crosstalk appears in the two product ion spectra. Approximately 30% of the signal from each product ion peak is lost. This figure would be closer 60% if a further quadrupole set mass transition was performed prior to and after those used in this example, since inter scan time periods corresponding to both the leading and trailing edges of each chromatogram shown in FIGS. 16A-C would need to be used in order to limit crosstalk.

Figure 19:
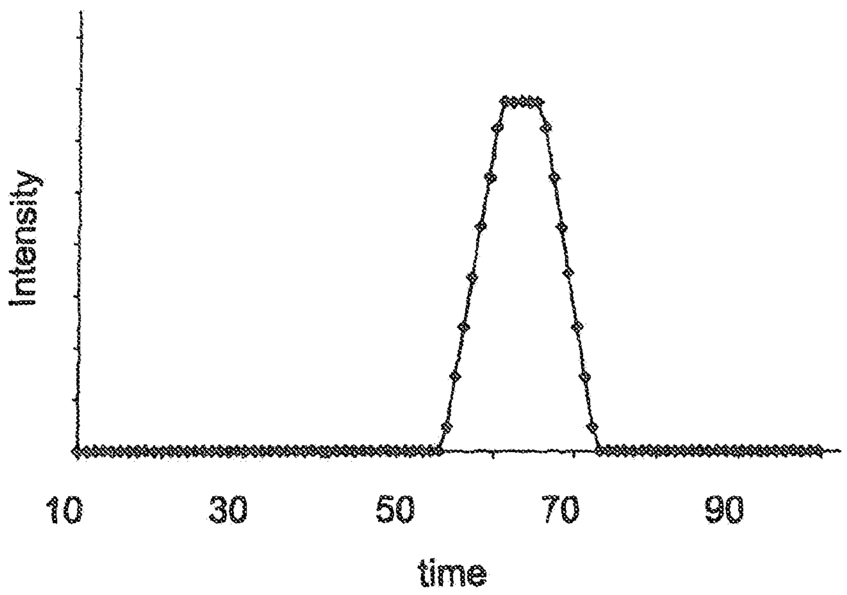
FIG. 19 shows a point spread function.

In contrast, according to the preferred method of the present invention, no inter scan time period is used (and the switching of the quadrupole is not synchronised acquisition of data), and the resulting data is post-processed. According to an embodiment, the data is post-processed using deconvolution. In order to further illustrate this embodiment, the data used in the above example was deconvoluted using the method of non negative least squares (Lawson, C. L. & Hanson, B. J. (1974), Solving Least Squares Problems, Prentice-Hall) using a point spread function of the form shown in FIG. 19.

Figure 20A:
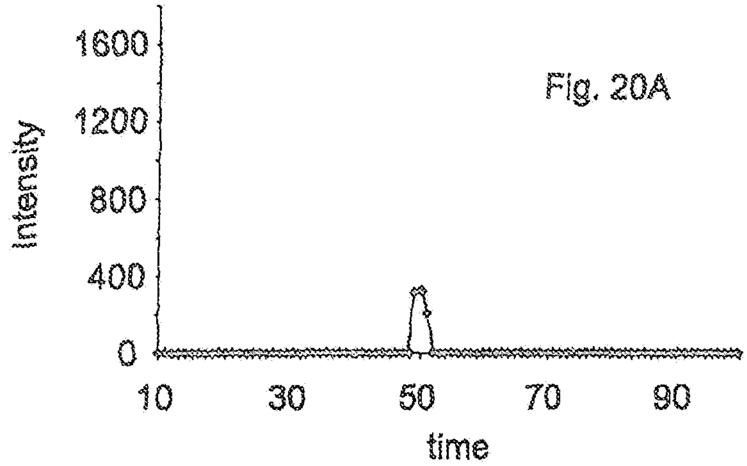
FIG. 20A shows the output of a non negative least squares deconvolution applied to the reconstructed mass chromatogram of the product ion peak at m/z=50 shown in FIG. 16A.
Figure 20B:
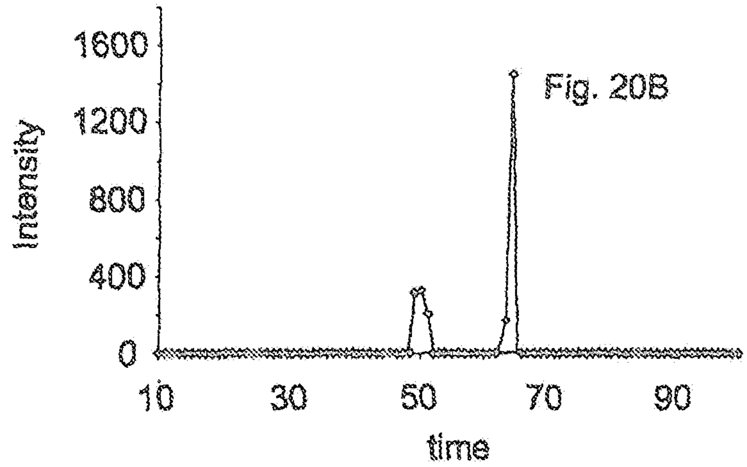
FIG. 20B shows the output of a non negative least squares deconvolution applied to the reconstructed mass chromatogram of the product ion peak at m/z=200 shown in FIG. 16B.
Figure 20C:
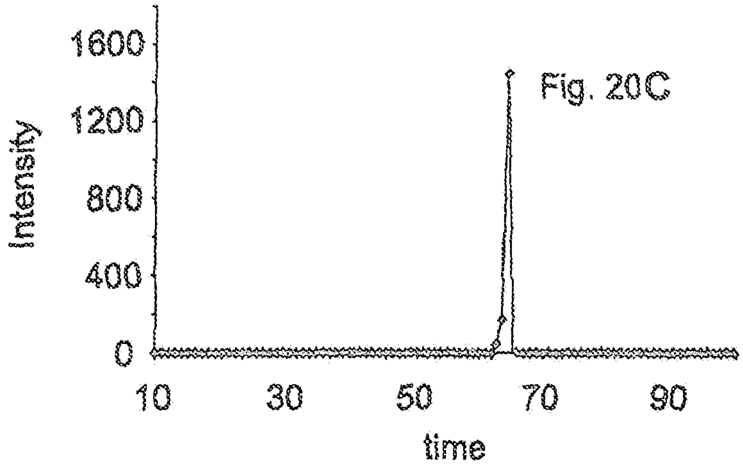
FIG. 20C shows the output of a non negative least squares deconvolution applied to the reconstructed mass chromatogram of the product ion peak at m/z=100 shown in FIG. 16C.

FIG. 20A shows the output of the non negative least squares deconvolution applied to the reconstructed mass chromatogram of the product ion peak at m/z=50 shown in FIG. 16A. FIG. 20B shows the output of the non negative least squares deconvolution applied to the reconstructed mass chromatogram of the product ion peak at m/z=200 shown in FIG. 16B. FIG. 20C shows the output of the non negative least squares deconvolution applied to the reconstructed mass chromatogram of the product ion peak at m/z=100 shown in FIG. 16C.

The width of each chromatographic peak in FIGS. 20A-C represents uncertainty in its time position due to the introduction of the Poisson noise.

The deconvoluted chromatogram shown in FIG. 20B, for the peak at m/z=200 illustrates the power of the deconvolution method to separate the signals corresponding to each precursor ion.

The intensity associated with each product ion peak, and information about which precursor ion each product ion is related to, may be determined by using a simple peak detection algorithm, and by summing the intensities of the chromatographic peaks within defined time windows.

The resulting intensities of each of the product ion peaks using the preferred method and the example deconvolution procedure are given in FIG. 21. The peak intensities are represented accurately to within around 1%. This small difference is mainly due to the Poisson statistics added to the theoretical model.

Although the present invention has been described with reference to preferred embodiments, it will be apparent to those skilled in the art that various changes in form and detail may be made without departing from the scope of the invention as defined by the accompanying claims.

The invention claimed is:

1. A method of analysing a sample comprising:

operating a mass spectrometer in a state or mode wherein first ions are analysed;

switching a state or mode of said mass spectrometer so that second ions are analysed, wherein said step of switching a state or mode of said mass spectrometer comprises switching or altering an operational parameter of said mass spectrometer;

acquiring a stream of mass spectral data wherein the acquisition of said mass spectral data is substantially asynchronous with or is not synchronised with the switching of said mass spectrometer between states or modes; and post-processing said stream of mass spectral data to produce: (i) mass spectral data relating to said first ions; or (ii) mass spectral data relating to said second ions.

2. A method as claimed in claim 1, wherein said method further comprises repeatedly switching said mass spectrometer between different states or modes.

3. A method as claimed in claim 1, wherein said step of switching a state or mode of said mass spectrometer comprises switching a state or mode or said mass spectrometer substantially abruptly or without pausing for a delay period during which delay period said mass spectrometer would otherwise be allowed to equilibrate.

4. A method as claimed in claim 1, wherein said step of switching a state or mode of said mass spectrometer comprises changing, switching, altering or varying a composition or intensity of a population of ions.

5. A method as claimed in claim 1, wherein said step of switching a state or mode of said mass spectrometer comprises switching a polarity of an ion source.

6. A method as claimed in claim 1, wherein said step of switching a state or mode of said mass spectrometer comprises fragmenting or reacting parent ions to produce fragment or product ions.

7. A method as claimed in claim 1, wherein said step of switching a state or mode of said mass spectrometer comprises switching transmission characteristics of a mass, mass to charge ratio, ion mobility or differential ion mobility filter or separator.

8. A method as claimed in claim 1, wherein said step of switching a state or mode of said mass spectrometer comprises selecting a different species of parent or precursor ion.

9. A method as claimed in claim 1, wherein said step of switching a state or mode of said mass spectrometer comprises selecting a different Collision Induced Dissociation collision energy.

10. A method as claimed in claim 1, wherein said step of switching a state or mode of said mass spectrometer comprises selecting a different fragmentation or reaction state of said mass spectrometer so that different ions are fragmented or reacted or ions are fragmented or reacted to different degrees.

11. A method as claimed in claim 1, wherein said stream of mass spectral data which is acquired is substantially continuous.

12. A method as claimed in claim 1, wherein said step of acquiring a stream of mass spectral data comprises continuously acquiring a stream of mass spectral data.

13. A method as claimed in claim 1, wherein said step of acquiring a stream of mass spectral data comprises substantially continuously acquiring mass spectral data without dividing a mass spectral data acquisition period into a plurality of mass spectral data acquisition windows separated from each other by an equilibration delay time period during which time period: (i) no mass spectral data is acquired; or (ii) said mass spectrometer is allowed to equilibrate; or (iii) said mass spectrometer is switched between states or modes.

14. A method as claimed in claim 1, wherein said step of acquiring a stream of mass spectral data comprises substantially continuously acquiring mass spectral data without pausing acquisition of said mass spectral data immediately before or during or immediately after a state or mode of said mass spectrometer has been switched.

15. A method as claimed in claim 1, further comprising:

repeatedly switching said mass spectrometer between a first state or mode and a second state or mode, wherein said mass spectrometer is in said first state or mode for a time T1 and is in said second state or mode for a time T2;

wherein said stream of mass spectral data is continuously acquired over a time period >T1 and >T2.

16. A method as claimed in claim 1, further comprising:

operating said mass spectrometer in a first state or mode wherein said first ions are analysed during a first time period t1-t2;

switching said state or mode of said mass spectrometer to a second state or mode wherein said second ions are analysed during a second time period t2-t3 immediately following said first time period;

operating said mass spectrometer in said second state or mode during a third time period t3-t4 immediately following said second time period; and continuously acquiring mass spectral data during said first, second and third time periods tl-t4.

17. A method as claimed in claim 1, further comprising mass analysing said first ions or said second ions.

18. A method as claimed in claim 17, further comprising mass analysing said first ions or said second ions using an orthogonal acceleration Time of Flight mass analyser, a quadrupole mass analyser or a Fourier Transform mass analyser.

19. A method as claimed in claim 1, wherein during a single mass spectral data acquisition period a state or mode of said mass spectrometer is switched a plurality of times.

20. A method as claimed in claim 1, wherein a state or mode of said mass spectrometer is repeatedly switched with a frequency f1 and wherein mass spectral data is acquired during acquisition periods with a frequency f2, wherein f2 <f1.

21. A method as claimed in claim 1, wherein said stream of mass spectral data is acquired substantially independently of any switching of a state or mode of said mass spectrometer.

22. A method as claimed in claim 1, wherein:

said stream of mass spectral data is acquired during a mass spectral data acquisition period; and said acquisition period is substantially asynchronous with or is not synchronised with the switching of said mass spectrometer between states or modes.

23. A method as claimed in claim 22, wherein a start or end time of said acquisition period is substantially asynchronous with or is not synchronised with the switching of said mass spectrometer between states or modes.

24. A method as claimed in claim 1, wherein:

said stream of mass spectral data is acquired during a mass spectral data acquisition period;

said acquisition period comprises a plurality of sample periods; and said sample periods are substantially asynchronous with or are not synchronised with the switching of said mass spectrometer between states or modes.

25. A method as claimed in claim 24, wherein start or end times of said sample periods are substantially asynchronous with or are not synchronised with the switching of said mass spectrometer between states or modes.

26. A method as claimed in claim 24, wherein a state or mode of said mass spectrometer is repeatedly switched with a frequency f1 and wherein said sample periods have a frequency f3, wherein f3 >f1.

27. A method as claimed in claim 1, wherein said step of post-processing said stream of mass spectral data comprises detecting ion peaks in said stream of mass spectral data and determining a plurality of ion peak times and a plurality of ion peak intensities associated with said stream of mass spectral data.

28. A method as claimed in claim 1, wherein said step of post-processing said stream of mass spectral data comprises determining which portions or sample periods of said stream of mass spectral data relate to said first ions or to said second ions.

29. A method as claimed in claim 1, wherein said step of post-processing said stream of mass spectral data comprises determining which portions or sample periods of said stream of mass spectral data relate to both said first ions and to said second ions, and rejecting those portions or sample periods.

30. A method as claimed in claim 1, wherein said step of post-processing said stream of mass spectral data comprises producing a mass spectrum for (i) said first ions or (ii) said second ions by combining portions or sample periods of said stream of mass spectral data determined to relate to said first ions or by combining portions or sample periods of said stream of mass spectral data determined to relate to said second ions.

31. A method as claimed in claim 1, wherein said step of post-processing said stream of mass spectral data comprises producing reconstructed mass chromatograms for ion peaks appearing in said stream of mass spectral data.

32. A method as claimed in claim 31, further comprising deconvoluting each of said mass chromatograms and determining one or more deconvoluted chromatogram peaks associated with each of said mass chromatograms.

33. A method as claimed in claim 32, wherein said step of deconvoluting each of said mass chromatograms comprises determining or approximating a point spread function characteristic of chromatogram peaks in said mass chromatograms.

34. A method as claimed in claim 32, further comprising determining which of said deconvoluted chromatogram peaks relate to said first ions or determining which of said deconvoluted chromatogram peaks relate to said second ions.

35. A method as claimed in claim 34, farther comprising producing a mass spectrum for (i) said first ions or (ii) said second ions by combining said deconvoluted chromatogram peaks determined to relate to said first ions or by combining said deconvoluted chromatogram peaks determined to relate to said second ions.

36. A mass spectrometer comprising:

a control system arranged and adapted:

(i) to operate a mass spectrometer in a state or mode wherein first ions are analysed;

(ii) to switch or alter an operational parameter of said mass spectrometer to switch a state or mode of said mass spectrometer so that second ions are analysed;

(iii) to acquire a stream of mass spectral data wherein the acquisition of said mass spectral data is substantially asynchronous with or is not synchronised with the switching of said mass spectrometer between states or modes; and (iv) to post-process said stream of mass spectral data to produce: (a) mass spectral data relating to said first ions; or (b) mass spectral data relating to said second ions.

* * * * *